H. WILEMAN.
SPRING WHEEL.
APPLICATION FILED JULY 22, 1918.
1,344,012.
Patented June 22, 1920.
2 SHEETS—SHEET 2.
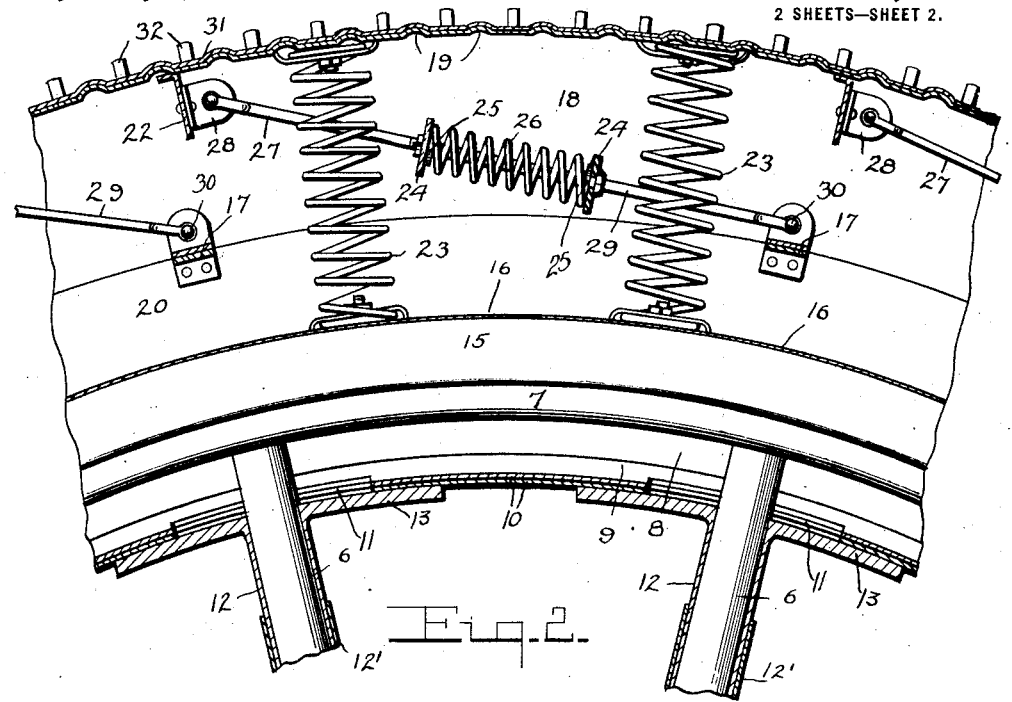
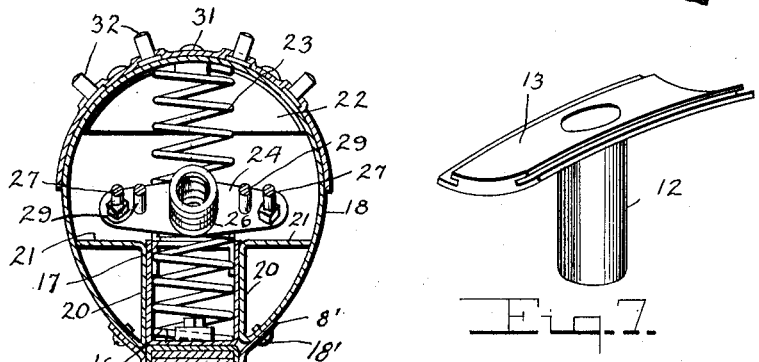
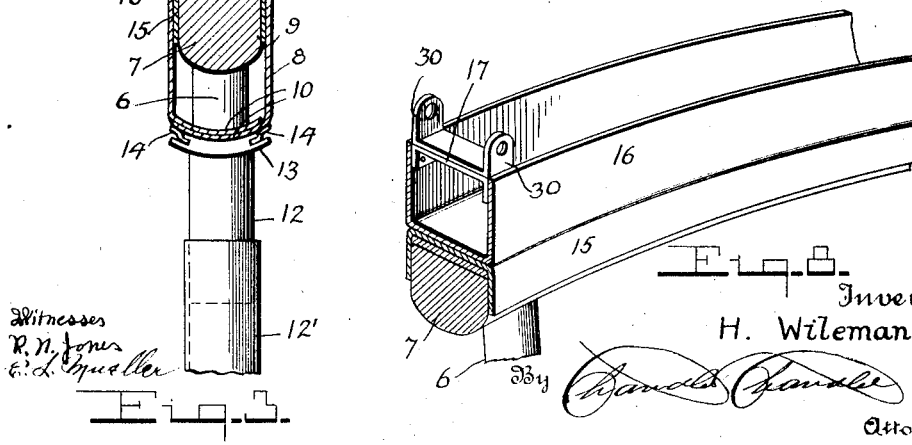
Inventor
H. Wileman

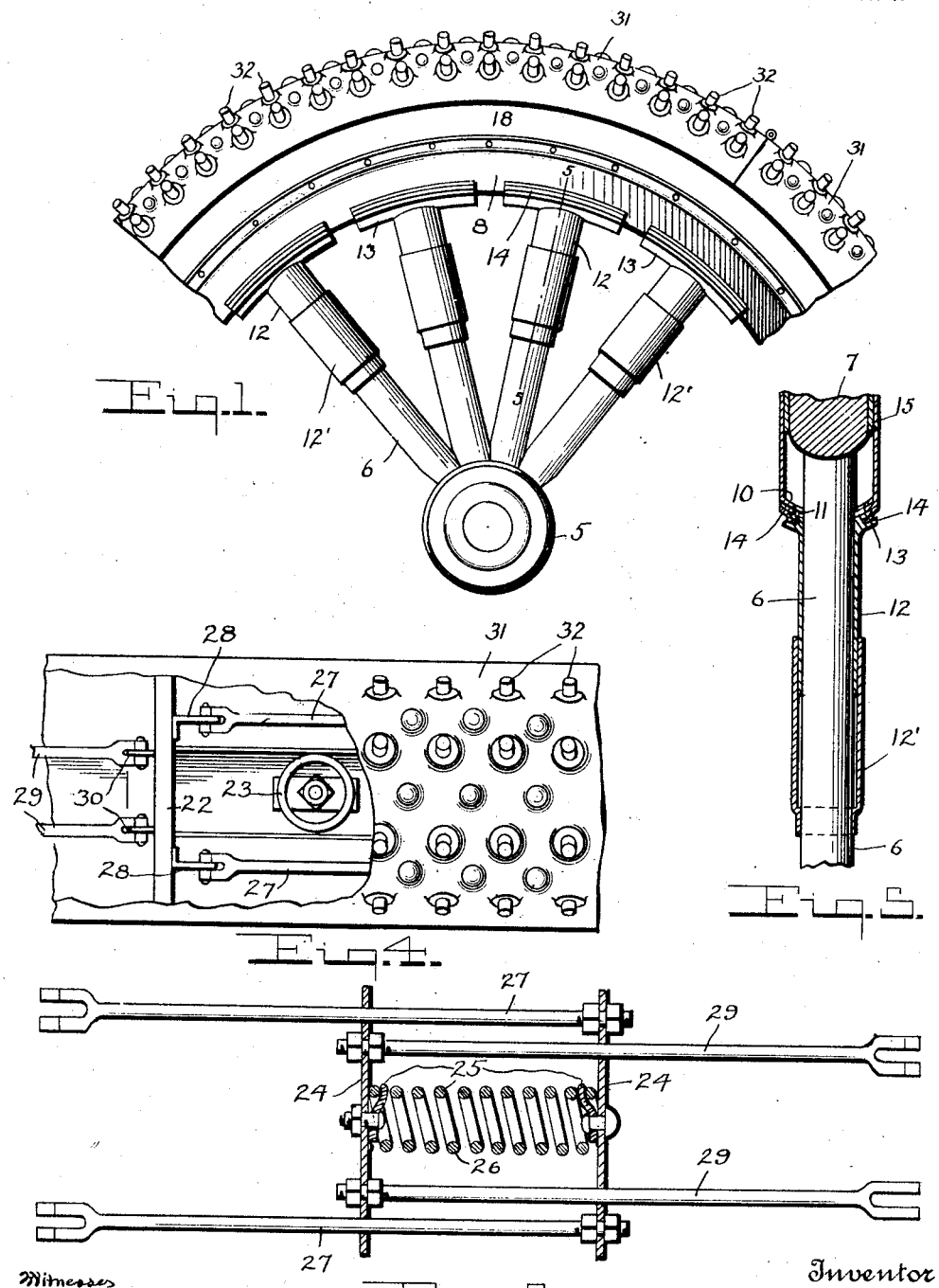

UNITED STATES PATENT OFFICE.

HARTFORD WILEMAN, OF CLAY CENTER, NEBRASKA.

SPRING-WHEEL.

1,344,012.

Specification of Letters Patent.   Patented June 22, 1920.

Application filed July 22, 1918. Serial No. 246,059.

*To all whom it may concern:*

Be it known that I, HARTFORD WILEMAN, a citizen of the United States, residing at Clay Center, in the county of Clay and State of Nebraska, have invented certain new and useful Improvements in Spring-Wheels; and I do hereby declare the following to be a full, clear, and exact description of the invention, such as will enable others skilled in the art to which it appertains to make and use the same.

This invention is an improvement in vehicle wheels and has particular reference to a spring wheel construction.

An object of the invention is to provide an improved construction wherein a tread or tire is so mounted with respect to the felly of the wheel that the same will have both radial and circumferential movements relative thereto.

Another object is to provide a spring wheel of this character which is simple in construction, easy to manufacture and effective in carrying out the purpose for which it is designed.

The inventive idea involved is capable of receiving a variety of mechanical expressions one of which, for the purpose of illustrating the invention, is shown in the accompanying drawings wherein:—

Figure 1 is a fragmentary side elevation of the wheel constructed in accordance with the invention.

Fig. 2 is a vertical longitudinal section.

Fig. 3 is a transverse section.

Fig. 4 is a plan view with the tread or tire partly broken away.

Fig. 5 is a section on the line 5—5 of Fig. 1.

Fig. 6 is a horizontal section through one of the shock absorbing or cushioning devices employed in connection with the invention.

Fig. 7 is a perspective view of one of the mountings for the outer end of a spoke.

Fig. 8 is a fragmentary perspective view of a channel member secured to the felly of the wheel.

Referring more particularly to the accompanying drawings the numeral 5 indicates the hub of a wheel having the usual spokes 6 radiating therefrom, the outer ends of which are secured to the felly 7.

A casing 8 is provided for receiving the felly 7 and consists of a pair of sections 9 having their inner edges 10 disposed in overlapping relation and cut away to provide openings 11 through which the outer ends of the spokes 6 extend. Said outer ends of the spokes are surrounded by the sleeves 12 carrying plates 13 curved to conform substantially to the contour of the inner edges 10 and receiving in their grooved longitudinal edges the guide strips 14 designed to retain the plates in their operative positions and permit of a circumferential movement of the casing 8 with respect to the felly, such movement being produced by the slight rotation of the hub of the wheel relative to the tread thereof when a vehicle is started from a standstill. A sleeve 12' is secured at its inner end to each spoke 6, and at its outer end it is enlarged and adapted to telescopically receive the adjacent sleeve 12.

A reinforcing plate 15 is fitted over the sides and rim surface of the felly 7 and said plate and felly have secured thereto a peripheral channel member 16 of substantially U-shaped formation in cross section, the distance between the sides of said member being equal to that of the width of the felly. At intervals, the outer edges of the channel member 16 are reinforced by the cross strips 17.

A tread or tire 18 formed of any suitable and somewhat flexible metal is shaped to conform substantially to the contour of an ordinary pneumatic tire and is provided in its tread portion with a plurality of anti-slipping projections 19. Each longitudinal edge of the tread 18 is secured by rivets 18' to the flange 8' of the casing 8, beyond which said edge portion is bent inwardly to provide the angularly disposed plates 20 and 21 the former of which is disposed in parallel relation to the similar plate of the opposite inner portion of the tread whereby to receive the channel member 16 therebetween and permit of movements thereof together with the felly 7. The free longitudinal edges of the plates 21 are soldered or otherwise secured to the inner surface of the tread 18 adjacent the rim portion thereof so as to brace or reinforce the sides of the tread when pressure is brought to bear thereon. The tread portion of the tread 18 is also reinforced by the transverse braces 22 and disposed between adjacent braces in any desired number of strong coil springs 23 arranged radially with respect to the hub 5 and having their outer ends secured to the inner surface of the tread portion and their inner ends secured in the bottom of the channel member 16. These springs 23 normally exert an inward pressure upon the felly 7 and are adapted to support the weight of the wheel and yieldably permit of an outward movement of the felly relative to the tread 18 at the point of contact of the tread with the ground.

It will be apparent that when a vehicle is started from a standstill the movement imparted to the hub 5 of the wheel by the rotation of the axle upon which said hub is mounted will produce a circumferential or rotary movement of the felly 7 and channel member 16 with respect to the tread 18 and in order to relieve the shock of the sudden transmission of this rotary movement of the felly upon said tread member there is preferably provided a plurality of shock absorbing or cushioning devices arranged at intervals about the interior of the tread portion and between adjacent springs 23. Each of these devices preferably consists of a pair of relatively movable transverse bars or plates 24. Carried by the mutually adjacent faces of the plates 24 are the tongued washers 25 with which are engaged the ends of a spring 26 interposed between the bars to normally force the same apart. Each end of one of the bars 24 has adjustably secured thereon one end of a rod 27 the intermediate portion of which passes through the adjacent end of the other bar 24 and has its other end secured to the lug 28 carried by the adjacent brace 22. The second-named bar 24, or that one through which the rods 27 extend, has secured thereto in a manner similar to that in which the rods 27 are secured to the first-named bar 24, the ends of the rods 29 which extend in an opposite direction from the rods 27 and through said first-named bar 24. The other ends of said rods 29 are bifurcated and pivotally connected to lugs 30 fixed at the free longitudinal edges of the channel member 16, the rods 27 and 29 of each pair being disposed on opposite sides of the corresponding springs 23. From this construction, it will be apparent that should a peripheral or rotary movement of the felly 7 in either direction occur there will be a pull or push exerted upon either pair of rods 27 or 29 and said pull or push will be against the tension of the spring 26 which will absorb the shock and aid in gradually imparting to the tread 18 a movement in unison with the felly.

An anti-slipping device may be employed in connection with the tread 18 and preferably comprises a pair of hingedly connected sections 31 adapted to slip over the tread 18 and provided with the outwardly projecting studs 32.

What is claimed is:—

1. A vehicle wheel comprising a felly, a sectional casing therefor, spokes secured to the felly and extending through said casing and having a movement relative thereto, a channel member secured to said felly and movable therewith, a tread secured to said casing and having the portions adjacent the felly directed outwardly in spaced relation and between which the channel member is slidably received and then laterally in opposite directions against the inner surface of the tread member, and coil springs interposed between the bottom of said channel member and the tread portion of said tread.

2. A vehicle wheel comprising a felly, a sectional casing therefor, spokes secured to the felly and extending through said casing and having a movement relative thereto, a channel member secured to said felly and movable therewith, a tread secured to said casing and having the portions adjacent the felly directed outwardly in spaced relation and between which the channel member is slidably received and then laterally in opposite directions against the inner surface of the tread member, coil springs interposed between the bottom of said channel member and the tread portion of said tread, and shock absorbing devices interposed between adjacent coil springs and connected to said channel member and to said tread.

3. A vehicle wheel comprising a felly, a sectional casing therefor, spokes secured to the felly and extending through said casing and having a movement relative thereto, a channel member secured to said felly and movable therewith, a tread secured to said casing and having the portions adjacent the felly directed outwardly in spaced relation and between which the channel member is slidably received and then laterally in opposite directions against the inner surface of the tread member, coil springs interposed between the bottom of said channel member and the tread portion of said tread, shock absorbing devices interposed between adjacent coil springs and connected to said channel member and to said tread, each of said shock absorbing devices consisting of transversely disposed bars, a coil spring interposed therebetween for normally forcing the same apart, and a pair of rods connected to each bar and extending through the other bar, one pair of rods being connected to said channel member and the other pair of rods being connected to said tread member.

In testimony whereof I affix my signature in the presence of two witnesses.

HARTFORD WILEMAN.

Witnesses:
LESTER W. MOON,
THOS. A. SIEFKEN.